March 21, 1950     C. J. HORNKOHL ET AL     2,501,175
ICING MECHANISM
Filed April 28, 1948     2 Sheets-Sheet 1
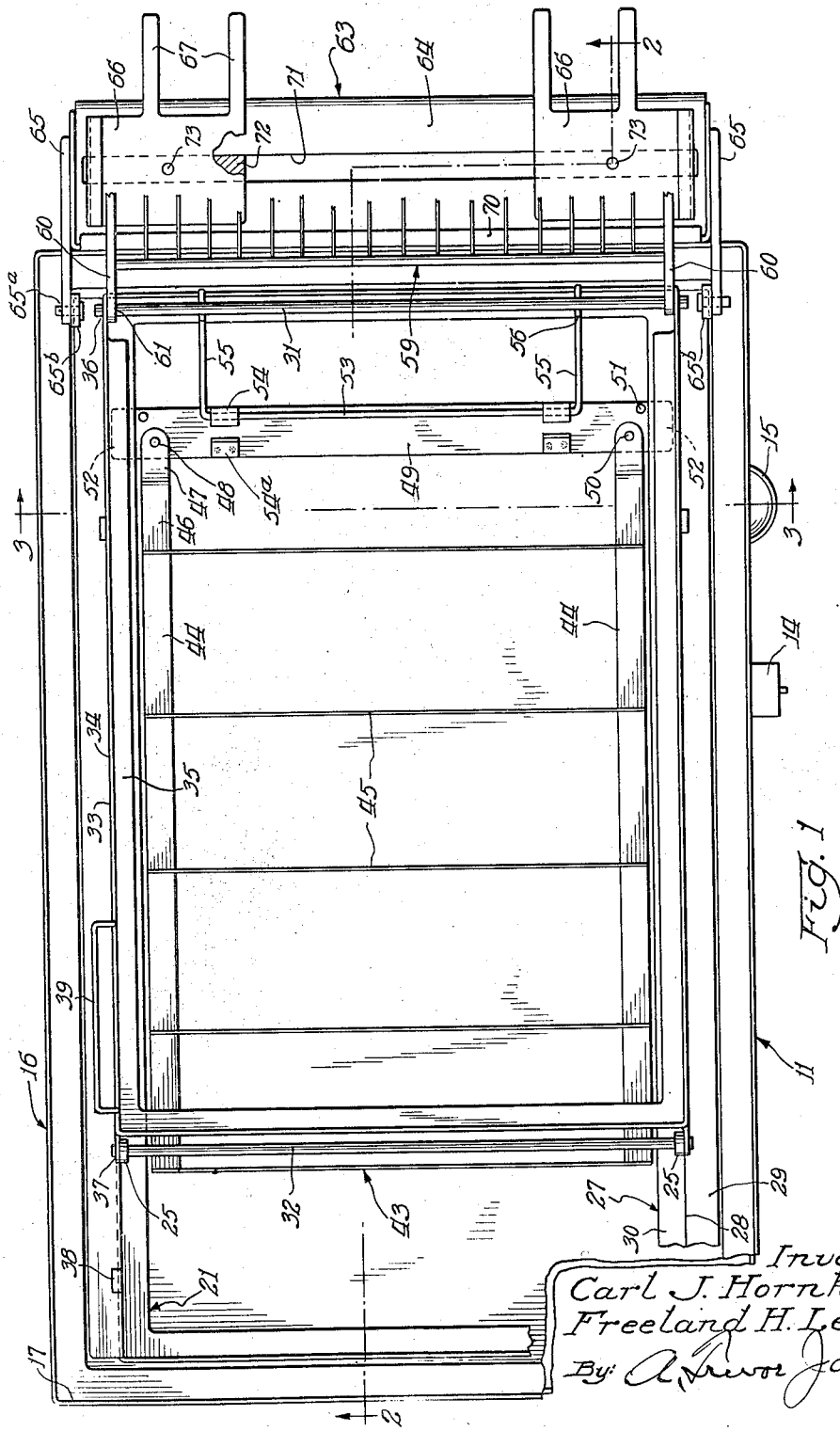
Fig. 1
Inventors:
Carl J. Hornkohl
Freeland H. Leslie
By: A. Trevor Jones
Atty.

March 21, 1950
C. J. HORNKOHL ET AL
2,501,175
ICING MECHANISM
Filed April 28, 1948
2 Sheets-Sheet 2
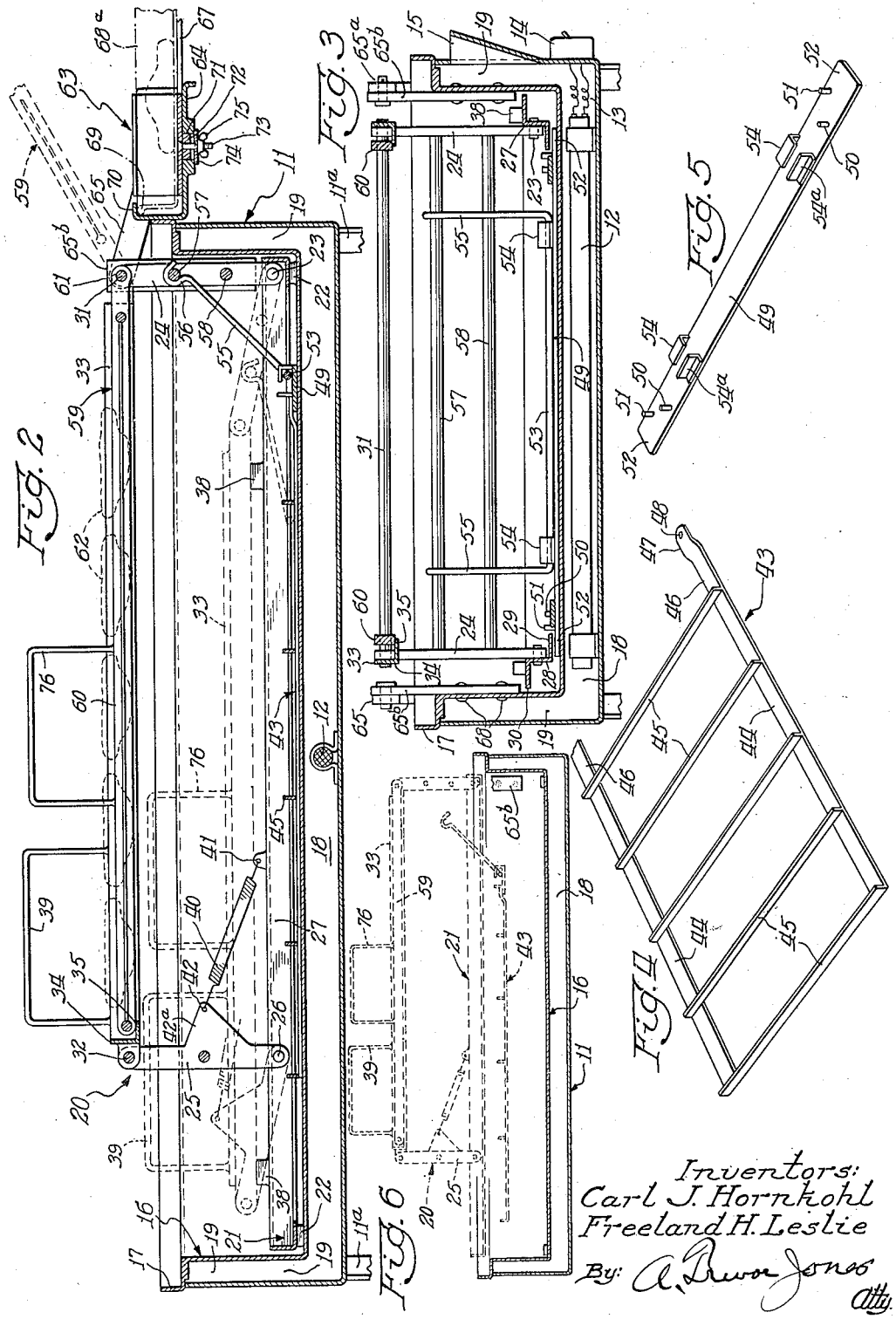
Inventors:
Carl J. Hornkohl
Freeland H. Leslie
By: A. Trevor Jones
Atty.

Patented Mar. 21, 1950

2,501,175

UNITED STATES PATENT OFFICE 2,501,175

ICING MECHANISM

Carl J. Hornkohl, Chicago, and Freeland H. Leslie, Glen Ellyn, Ill.

Application April 28, 1948, Serial No. 23,764

9 Claims. (Cl. 91—2)

This invention relates to improvements in icing mechanism more particularly for use in commercial bakeries for applying so-called icing to bakery products such as cakes, sweet rolls, doughnuts, and the like.

This is an improvement on icing mechanisms shown in prior Patents No. 2,026,203, of December 31, 1935, and 2,045,272 of June 23, 1936.

Among other objects the present invention aims to simplify and otherwise improve a device of this character.

An important aspect of the present invention is the provision of agitating means for the icing apart from the other mechanism and which may be actuated by movement of the support for the bakery goods as the latter are depressed into and elevated from the icing pan.

A further object of the invention is the provision for separation of the icing receptacle, means for depressing the bakery goods thereinto, and the agitator, whereby the parts may be more thoroughly cleaned.

A still further object of the invention is the provision of a unitary device including a water jacket and heating element into which the icing receptacle and bakery goods supporting means may be placed and from which they are readily removable for ease of assembly and disassembly.

These and other objects and advantages will be apparent from the following description, taken together with the accompanying drawings, of an illustrative embodiment of the invention, and in which drawings—

Figure 1 is a plan view of mechanism embodying the present invention, parts being shown swung to one alternative position and broken off to save space;

Figure 2 is a longitudinal sectional view taken on the staggered line 2—2 of Fig. 1, but with the parts shown in alternative position in Fig. 1 shown in another alternative position with parts shown in dotted lines in alternative positions, and also showing the bakery product in dotted lines;

Figure 3 is a cross-section taken on the line 3—3 of Fig. 1;

Figure 4 is a separated perspective view of a form of agitator following the present invention;

Figure 5 is a separated perspective view of agitator mounting and guide bar; and Figure 6 is a reduced view, somewhat diagrammatic, showing separable features of parts shown in the other views.

Referring in detail to the illustrative construction shown in the drawings, the numeral 11 indicates a water jacket in the form of a tank in which water may be received to be heated as by the electrical heating element 12 which may be connected by the leads 13 with a switch box 14 on the exterior of the tank, to which a source of electric current may be connected. When other parts, presently referred to, are entered into the tank 11, the latter may be supplied with water as through a feed funnel 15 formed integrally with the tank wall and providing also a sight gauge for indicating the level of water in the tank. The tank 11 may have legs 11a for supporting it on the floor of the bakery at about the height of the usual table.

In accordance with the present invention, the tank 11 as so constructed is adapted to have received therein a separable icing receptacle 16 having an offset flanged upper margin 17 which latter may rest on the upper edges of the vertical walls of the tank 11. When the receptacle is entered into the tank, the heated water in the tank may circulate along the space 18 between the tank bottom and the receptacle bottom and also in the spaces 19 between the tank sides and the receptacle sides, a space being left all around the receptacle for such circulation purposes, for maintaining the icing warm and thus in liquid state.

Further in accordance with the present invention, the receptacle 16 may receive therein a bakery goods supporting member such as the chassis device indicated in general by the numeral 20. The chassis device 20, as here shown, is of somewhat skeleton construction as more generally described and claimed in said Patent No. 2,026,203, but in the present improvement is separable from the receptacle 16, and, includes a lower or base skeleton section 21 of rectangular form which is adapted to lie on the spacer bosses 22 rising from the bottom of the receptacle 16 interiorly thereof, at suitably spaced apart points. Rising from the base 21 and pivoted thereto as at 23 are a pair of links 24, one at each side of the base, and adjacent its other end, but spaced inwardly from this end of the base, are another pair of links 25 pivoted to the base as at 26 respectively. The longitudinally extending runners 27 of the base 21 are preferably of Z-angles as shown having an upright web 28 to which the links 24 and 25 may be pivoted, on the inner faces of the webs. The Z-formation provides a lower inwardly extending horizontal flange 29 and an upper outwardly extending horizontal flange 30, for each runner 27.

The pair of links 24 are joined at their top by a cross-rod 31 and similarly the pair of links 25 by cross-rod 32. Articulated with the links and cross-rods just referred to and serving to maintain the links parallel is a U-shape chassis upper skeleton 33 which is of L-angle cross-section providing an upright portion 34 and an inwardly extending flange or seat 35. The legs of this U-shape member 33 are articulated as at 36 with the links 24, and cross-rod 31 and, at its other end, the chassis upper skeleton member is articulated at 37 with the links 25 and cross-rod 32. Thus the chassis is in the form of a parallelogram having a chassis upper skeleton which is depressible into the tank 16, the chassis parts collapsing upon themselves while still maintaining the upper and lower skeletons parallel and maintaining the upper skeleton 33 horizontal in this depressing movement from that shown in full lines to that shown in dotted lines in Fig. 2. In the latter position the upper skeleton may abut stop pads 38 carried by the lower skeleton runners 27.

The bail-like handle 39 upstanding from the upper skeleton 33 may be used to lower the latter into the receptacle 16, and to retract or return the chassis parts to full line position may be assisted by a pair of tension coil springs 40 anchored at one end as at 41 to the chassis runners 27 and at their other ends as at 42 to a bracket 42a extending forwardly of the links 25 at each side respectively, the springs being extended when the chassis upper skeleton is depressed.

Further in accordance with the present invention, lying along the bottom of the receptacle 16 and between the side runners 27 of the chassis lower skeleton 21 is an agitator element indicated generally by the numeral 43, which is here shown in the form of a grid having longitudinally extending members 44 and cross members 45, the latter being desirably of upstanding or flange like character as shown to create resistance to movement of the agitator in the icing and thereby agitation of the icing.

At its proximal end, the agitator 43 has its longitudinal members 44 extended as at 46 and the free ends thereof upwardly offset at 47 and perforated as at 48 to rest on the agitator actuator mounting and guide strip 49, which has studs 50 suitable for passing through perforations 48 to operatively connect the agitator grid to the strip 49, while leaving it readily separable therefrom. The strip 49 also has other studs 51 located outwardly of the studs 50 and serving to locate the position of the strip 49 on the floor of the receptacle 16 with the strip ends 52 located slidingly under the horizontal flanges 29 of the chassis lower skeleton runners 27 which are spaced above the floor of the receptacle by the bosses 22 for this purpose. Thus the strip 49 and with it the agitator 43 may be reciprocated along the floor of the receptacle 16, and, to actuate this, a connection is provided between the agitator and the parallel movement supporting mechanism of the chassis 20.

As here shown, and still further in accordance with the present invention, the pitman or connecting rod member 53 is preferably of U-shape, with its bight engaged under the hook shape lugs 54 secured to the mounting and guide strip 49. The pitman member 53 has arms 55 which at their upper or outer end are bent into open loops 56 which rotatively hook upon and grasp, in one instance, the upper rod 57 of a pair of wrist rods 57 and 58 which extend between the links 24 of the chassis. These rods 57 and 58 are vertically spaced apart and serve a two-fold purpose, first, as reinforcing or stiffening members for the links 24, and, second, as selectively alternate fulcrums or wrist pins, so to speak, for the connecting member or pitman 53.

Adjacent the hook-like lugs 54 are a pair of abutment lugs 54a on the strip 49 which cooperate with the lugs 54 to retain the connecting member 53 loosely separably but operatively in engagement with the strip 49 and also to cause oscillating movement of the connecting member to result in reciprocable movement of the agitator 43 along the receptacle.

So constructed and arranged, as the chassis upper skeleton 33 is depressed from the full line to the dotted line position as in Fig. 2, the connecting member 53 is pushed forwardly and downwardly and with it the agitator 43 is pushed forwardly along the floor of the receptacle 16 to cause a stirring or agitating movement of the icing liquid in the receptacle and a circulation of the icing liquid so that all parts of the icing are brought successively into the area of the pan which is nearest the walls of the pan subject to the heat from the heated water in the tank 11 and particularly the area nearest the heating element 12, thus maintaining its liquidity. This agitation also prevents the formation of an undesirable crust on the uppermost surface of the icing which is deleterious to a good icing operation. It will be understood that movement of the agitator occurs not only in downward movement of the chassis parallel movement mechanism but also on return or upward movement of the latter from the dotted line position as in Fig. 2 to the full line position.

When the pitman or connecting member 55 is engaged as shown with the upper wrist rod 57, the agitator will have its stroke of maximum length. If it be desired to shorten the length of stroke for less stirring action, the pitman 55 may be engaged with the lower wrist rod 58, which has a smaller arc of movement.

For bringing the bakery goods into icing relationship, as previously described in said Patent No. 2,026,203, a grill-like drainer 59 has side bars 60 which are pivoted as at 61 to the cross rod 31 of the chassis which also connects the links 24, at that end of the chassis and to which the chassis upper skeleton 33 is also pivoted. The drainer 59 in one alternative position may be disposed to seat on the horizontal flanges 35 of the chassis upper skeleton 33, as shown in full lines in Fig. 2. At this time bakery goods to be iced, indicated diagrammatically in dotted lines at 62, lie in inverted position on the drainer and are thus carried down into the icing and back up again out of the icing when the chassis upper skeleton is depressed and retracted as already explained. The level of icing liquid in the receptacle is normally such as to immerse or dip just the inverted faces of the bakery goods 62 in the icing. When this has been done the goods may be removed as by hand and disposed right-side up for packaging or the like.

To get the bakery goods into the position shown in Fig. 2, the drainer 59 is swingable on the cross rod 31 from the position shown in full lines in Fig. 2 to a position somewhat as indicated in dotted lines in Fig. 2 and as fragmentarily indicated in Fig. 1. When so disposed, the drainer cooperates with a pan holder 63 also broadly described and claimed in said Patent No. 2,026,203.

As here shown, the pan holder 63 may include a clip-like element in the form of an interrupted casing 64 to which are secured a pair of arms 65 which are pivoted as at 65a to a pair of uprights 65b riveted as at 68 on the inner faces of the side walls of the receptacle 16 transversely aligned with the links 24 of the chassis when the latter are in vertical position. Thus the pan holder 63 is pivoted coaxially with the drainer 59, although separable therefrom.

The pan holder 63 may include a pair of independently laterally movable plates 66 having fingers 67 upon which a baking pan such as 68a may be slid from a conveyor (not shown), the forward edge of the pan 68a as at 69 engaging under an overhang 70 of the pan holder casing 64 to hold the pan in position. To adjust the plates 66 to various widths of baking pans, the casing 64 may be transversely slotted as at 71 and the plates 66 may have a cleat 72 which slides in the slot 71. Through the cleat 72 may pass a screw 73 on which may be disposed a washer 74 and a thumb nut 75 which may be tightened to fix the lateral adjustment of the plates.

So constructed and arranged, the drainer 59 and pan holder 63 (with the pans and contents held therebetween) may be swung from the position of the pan holder shown in Fig. 2 to an inverted position over the chassis, thus turning the goods over as already referred to, whereupon the pan holder may be swung back to the position shown in Fig. 2 leaving the drainer in position on the chassis as shown in full lines in Fig. 2 and with the inverted bakery goods thereon in position to be dipped.

For swinging movements of the drainer the latter may also have a bail-like handle 76 longitudinally and somewhat laterally offset from the handle 39 of the chassis.

When it is desired to remove the chassis, it may be slid out from under the uprights 67 which terminate short of the floor of the receptacle 16 to provide clearance for the chassis skeleton flanges 30. This may be done by first raising the distal end of the chassis (the end adjacent the links 25) and then lifting it out of the receptacle as shown in Fig. 6. Thereupon the chassis, agitator, agitator guide strip, and pitman, are readily separable.

Thus we have provided improved icing mechanism having automatic agitating means apart from the dipping means and insuring that parts are substantially completely and readily separable for thorough cleaning purposes. The chassis, including the drainer, is completely removable from the receptacle 16 and the latter with the pan holder, is completely removable from the tank 11, so that the icing receptacle may be turned upside down and steam-hosed, if desired, for thorough cleaning. Hence also no drain outlet is necessary in the receptacle. Furthermore, by the provision for hot water jacketing the receptacle and for automatically stirring the icing liquid therein, uniformity of temperature and consistency of the icing is maintained throughout the receptacle, thus insuring a more economical and improved icing operation.

It will be observed that the pan holder 63 is mounted on the icing receptacle 16 and is separable from the chassis 20, and also that the pan holder abuts the rim of the receptacle 16 to limit downward movement of the pan holder and maintain it in loading position as in Fig. 2.

The invention is not intended to be limited to details of construction shown for purposes of illustration. Furthermore, it is intended to be understood that all features of the invention need not at all times be used conjointly, since various combinations or sub-combinations thereof may at times be advantageously employed. Such changes may be made as fall within the scope of the appended claims without departing from the invention.

The invention having been described, what is here claimed is:

1. Icing mechanism comprising, in combination, a water jacket, an icing receptacle separably received in said water jacket, a supporting chassis separably received in said receptacle, a depressible drainer support carried by the chassis, reciprocable supporting mechanism for the support mounted on the chassis for causing movement of the support into and out of the receptacle, an icing agitator adjacent the bottom of said chassis, a motion transmitting connection between the agitator and the support whereby movement of the support moves the agitator in the receptacle, and a drainer for products to be iced mounted on the support, whereby the chassis, receptacle and water jacket may be completely separated for cleaning purposes.

2. The structure of claim 1 wherein a helical expansion spring is connected between the chassis and said supporting mechanism which is extended under tension when the drainer is lowered, said spring after extension exerting a force tending to move the agitator in a reverse direction.

3. The structure of claim 1 wherein an electrical heating element is disposed in the jacket to lie below the icing receptacle when received therein, and the agitator tends to circulate icing in the receptacle into the vicinity of said heating element.

4. That improvement in icing mechanism for bakery products embodying an icing receptacle and a depressible support for the product received in the receptacle, which comprises, pivoted equal length link supporting mechanism for the support maintaining the support parallel as it is depressed and elevated, an icing agitator in the receptacle reciprocable horizontally therein, and a pitman connection between the link mechanism and the agitator whereby pivotal movement of the mechanism moves the agitator reciprocally.

5. The structure of claim 4, wherein the link mechanism carries connector means for selectively connecting the pitman thereto at a plurality of points from the pivot whereby to vary the length of stroke of the agitator.

6. Icing mechanism for bakery products comprising, in combination, an icing receptacle, a supporting chassis in the receptacle having a lower skeleton and an upper skeleton, pivoted links connecting the skeletons, the upper skeleton being depressible into and out of the receptacle while being maintained parallel to the lower skeleton, a wrist rod connecting two of the links transversely of the chassis, a pitman having one end rotatively engaging the wrist rod, and a grid-like agitator lying along the bottom of the receptacle between the sides of the said lower skeleton, the other end of the pitman being articulated with the agitator, whereby depression and elevation of the upper skeleton causes the agitator to slide back and forth in the receptacle.

7. The structure of claim 6 wherein the agitator is connected to a mounting strip having hook lugs thereon and the pitman is in the form of a U-shape rod having its bight hooked to said lugs and its free ends engaging the wrist rod.

8. The structure of claim 6 wherein the lower skeleton is spaced slightly above the floor of the receptacle and the agitator is connected to a mounting strip having ends sliding under the lower skeleton and the strip has elements coacting with the skeleton to guide the strip in its movement.

9. In icing mechanism for bakery products embodying an icing receptacle and a bakery goods support, that improvement which comprises, an agitator member arranged to move in the receptacle in a horizontal plane therein for stirring the icing, means for vertically moving the support into the receptacle to dip the products into the icing, and motion transmitting mechanism interconnecting the support and the agitator for causing horizontal movement of the agitator upon vertical movement of the support.

CARL J. HORNKOHL.
FREELAND H. LESLIE.

REFERENCES CITED

The following references are of record in the file of this patent:

UNITED STATES PATENTS

| Number | Name | Date |
|---|---|---|
| 2,026,203 | Ackles | Dec. 31, 1935 |
| 2,045,272 | Hornkohl et al. | June 23, 1936 |
| 2,222,390 | Ackles | Nov. 19, 1940 |